Nov. 1, 1932.  J. G. BOUSLOG  1,885,223
ROD RACK
Filed Feb. 3, 1930    2 Sheets-Sheet 2
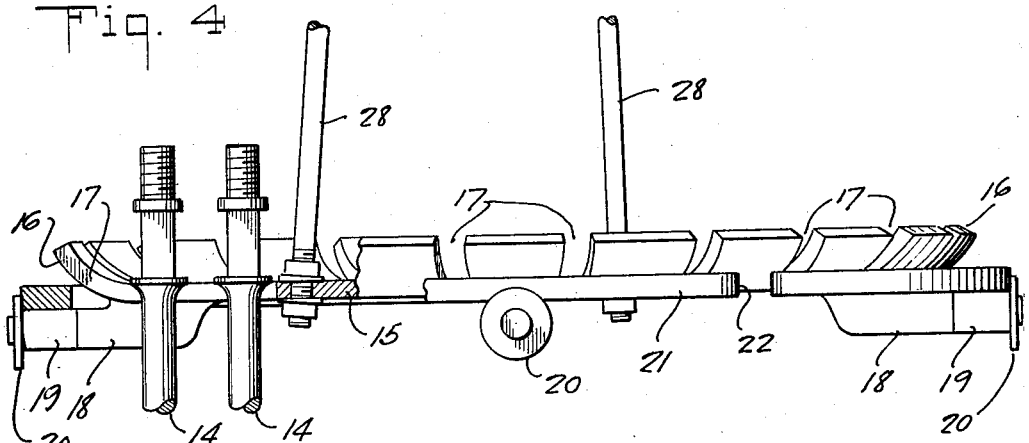
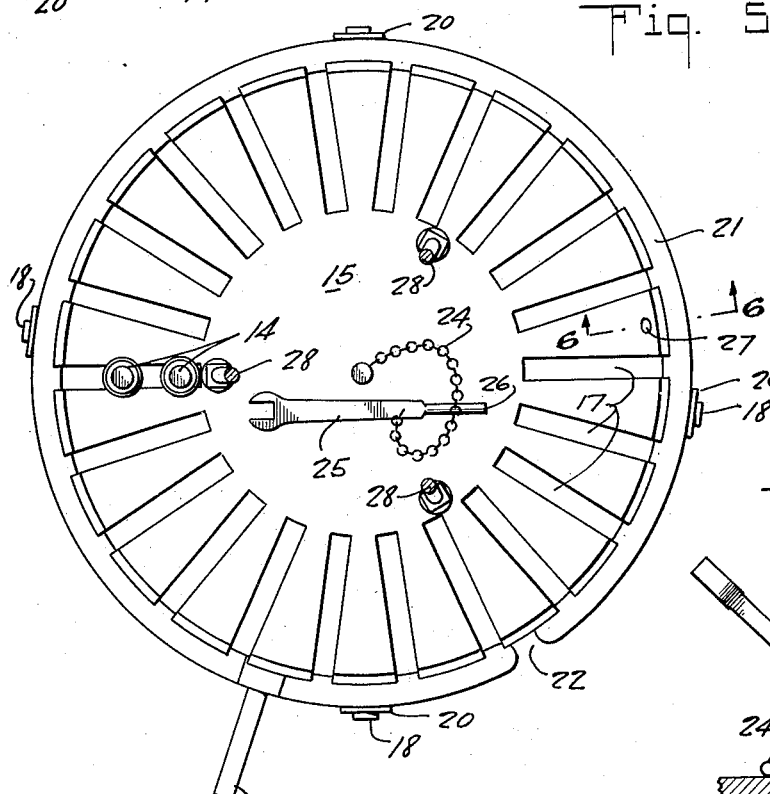
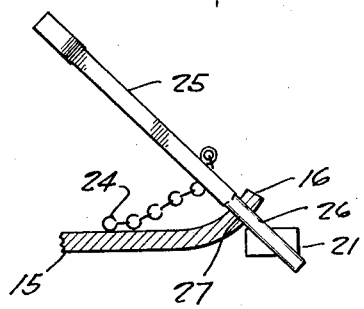
INVENTOR
John G. Bouslog
BY
Westall and Wallace
ATTORNEYS Patented Nov. 1, 1932

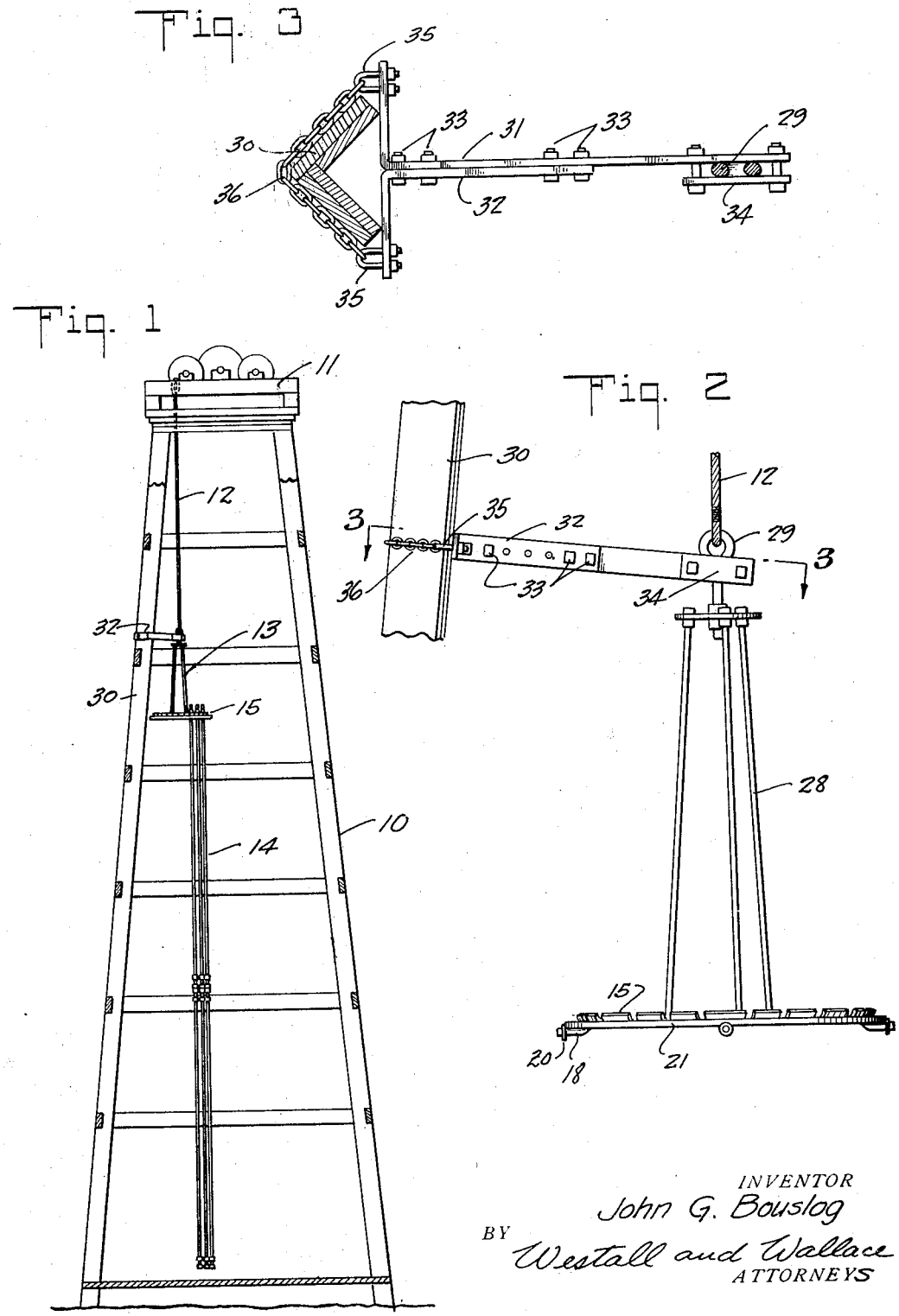

1,885,223

UNITED STATES PATENT OFFICE

JOHN G. BOUSLOG, OF LONG BEACH, CALIFORNIA

ROD RACK

Application filed February 3, 1930. Serial No. 425,571.

This invention relates to a rack for suspending sucker rod stands in derricks and like places. Such rod racks commonly are provided with a plurality of slots so that sucker rods may be inserted therein with the enlargements at their ends straddling the slots and resting upon the margins thereof. Sucker rods are liable to be displaced from the slots unless equipped with some safety device to hinder or prevent displacement.

The present invention has for its objects: first, the provision of a rod rack having a plurality of rod receiving slots and an aisle for entrance to and exit from any of the slots; second, a gate for said slots to close the mouths thereof, but having an aisle registerable with any selected slot to open the latter; third, the provision of a novel lock to hold the gate with all slots closed; and fourth, the provision of novel means to maintain the rack in position in a derrick.

An embodiment of the invention is illustrated in the accompanying drawings, in which:—

Fig. 1 is a vertical section through a well derrick having a rod rack mounted therein; Fig. 2 is a fragmentary view of the structure shown in Fig. 1 on an enlarged scale and showing the rod rack in elevation; Fig. 3 is a section as seen on the line 3—3 of Fig. 2; Fig. 4 is an elevation on an enlarged scale showing particularly the rod rack plate; Fig. 5 is a plan view of the rod rack plate; Fig. 6 is a section on an enlarged scale as seen on the line 6—6 of Fig. 5, but with a wrench in position to lock the gate.

Referring more particularly to the drawings, a conventional type of derrick is marked 10. At the top of the derrick is a crown block 11 and suspended from the gate thereof is a cable 12. Secured to the cable and supported thereby is the rod rack indicated generally by 13 in Fig. 1. Stands or length of sucker rod are suspended from the rack and marked 14.

The rod rack comprises a body or plate 15 of disk form having a turned marginal edge as shown in Figs. 4 and 5. The turned edge is marked 16. There are a plurality of radial slots 17 having open front ends forming mouths for receiving the stands of a sucker rod by introduction of the latter into the slots through the open front ends. In the drawings the pin ends of the sucker rods are shown, therebeing an enlargement at the ends such as to span the slots and rest upon the marginal edge. Underhanging the upturned lip 16 are brackets 18 having journals upon which are mounted rollers 19. There are washers 20 at the outer ends of the rollers. These washers 20 are for the purpose of holding in position a gate 21. Gate 21 is a ring mounted upon the rollers 19 so that it may be shifted by rotation and has an opening or aisle 22 capable of registration with the front end of any selected slot. A handle 23 is attached to the gate and serves for shifting the latter. Secured to the plate by a chain 24 is a wrench 25. This wrench has a pin end 26 adapted to be disposed in a bore 27. The bore extends through a lip and has its axis so directed that when wrench 25 is inserted in the bore as shown in Fig. 6, the pin end 26 may be disposed in the opening 22 of the gate. This locks the gate against rotation with all the slots closed. A tripod 28 has its legs extending upwardly. At the head of the tripod is an eye 29 for engagement by cable 12.

A stabilizing arm is secured to one of the corner posts of the derrick and about the eye 29. This stabilizing arm is for maintaining the rod rack in appropriate position within the derrick and to prevent rotation of the rack. Referring more particularly to Figs. 2 and 3, one of the corner posts of the derrick is marked 30, it being of the conventional angle form. Spanning the sides of the angle of the corner posts is the stabilizing arm base consisting of two angle members 31 and 32 secured together by bolts 33 to form a T. One angle has a branch extending beyond the continuous branch of the other angle 32 and has bolt holes for receiving a clamp plate 34 which secures the eye of the tripod in position and against rotation. U bolts 35 extend through the head of the T and are linked to a chain 36 which encompasses the corner posts. It will be obvious that the U bolts may be passed through any elected links of the chain and tightened by means of their nuts so as to firmly secure the stabilizing arm to the corner posts. It will be apparent that the stabilizing arm may be secured in any desired position upon the derrick, it projecting diagonally inwardly.

What I claim is:—

1. A rod rack comprising a body having a plurality of slots with front ends forming mouths disposed in a row, a gate confronting the mouths of said slots to close the latter, said gate being shiftable across said mouths and having an opening registerable with any selected slot for the admission or withdrawal of a rod, a bore in said body at the margin thereof and disposed between adjacent slots, the axis of said bore passing through said gate, and a stop member insertable in said bore to project through the opening in said gate and to lock the latter against shifting movement.

2. A rod rack comprising a circular plate having a plurality of radial slots with front ends forming mouths opening through the periphery, a ring gate revolubly mounted on said plate and confronting the mouths of said slots to close the latter so as to be shiftable across said mouths, said gate having an opening registerable with any selected slot for the admission or withdrawal of a rod, a bore in said plate at the margin thereof and disposed between adjacent slots, the axis of said bore passing through said gate, and a stop member insertable in said bore to project through the opening in said gate and to lock the latter against shifting movement.

3. A rod rack for sucker rods having coupling joints with lateral shoulders comprising a body having a plurality of slots longitudinally open at the front ends for receiving rods by insertion through said front ends with the coupling joint portions extending above said body and the shoulders resting thereon so as to suspend said rods, said slots being disposed side by side, and a closure member for the front ends of said slots having a through aisle registerable with the front end of any selected slot to enable withdrawal therefrom of a rod, said member being disposed so that all of said slots are transversely open.

4. A rod rack for sucker rods having coupling joints with lateral shoulders comprising a body having a plurality of slots with open front ends forming mouths disposed in a row adapted to receive sucker rods with the shoulders resting on said body at the margins of said slots, a gate confronting the mouths of said slots to close only the mouths, said gate being shiftable across said mouths and having a through opening registerable with any selected slot for the admission or withdrawal of a rod from said rack.

5. A rod rack for sucker rods having coupling joints with lateral shoulders comprising a circular plate having a plurality of radial slots with front ends forming mouths opening through the periphery adapted to receive sucker rods with the shoulders resting on said plate at the margins of said slots, a ring gate revolubly mounted on said plate in position with all said slots transversely open and confronting the mouths of said slots to close the latter so as to be shiftable across said mouths, said gate having a through opening registerable with any selected slot for the admission or withdrawal of a rod from said rack.

In witness that I claim the foregoing I have hereunto subscribed my name this 22nd day of January, 1930.

JOHN G. BOUSLOG.